H. WORKMAN.
MOTION PICTURE APPARATUS.
APPLICATION FILED MAY 8, 1916.
1,309,992.
Patented July 15, 1919.
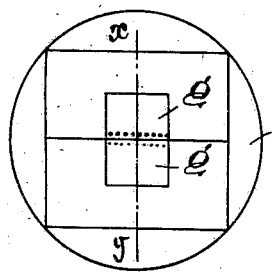
Fig. 1.
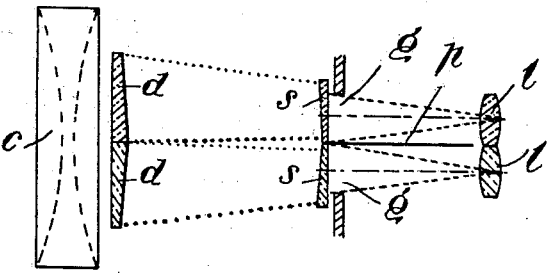
Fig. 2.
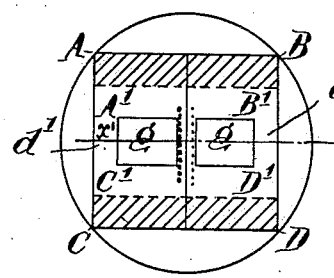
Fig. 3.
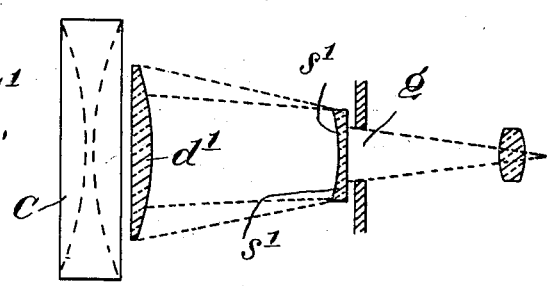
Fig. 4.
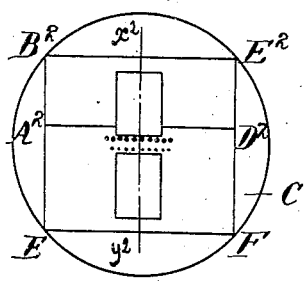
Fig. 5.
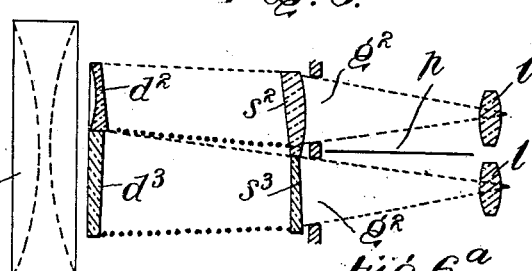
Fig. 6.
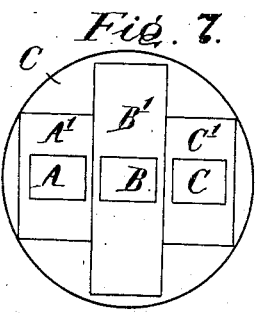
Fig. 7.
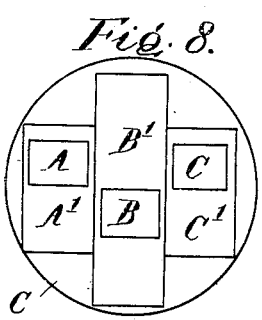
Fig. 8.
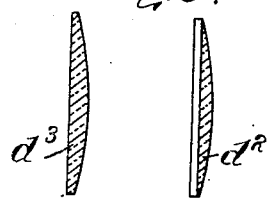
Fig. 6ᵃ
Fig. 6ᵇ
Witnesses:
Albert Barnes
Henry Richard Brunsdon
Inventor.
Harold Workman
by HC Heide Attorney.

UNITED STATES PATENT OFFICE.

HAROLD WORKMAN, OF GLASGOW, SCOTLAND.

MOTION-PICTURE APPARATUS.

1,309,992. Specification of Letters Patent. Patented July 15, 1919.

Application filed May 8, 1916. Serial No. 96,193.

*To all whom it may concern:*

Be it known that I, HAROLD WORKMAN, a subject of His Majesty King George V of the United Kingdom of Great Britain and Ireland and of the British Dominions beyond the Sea and Emperor of India, residing at Glasgow, Scotland, have invented certain new and useful Improvements in or Relating to Motion-Picture Apparatus, of which the following is a specification.

This invention relates to projecting lanterns and more particularly to cinematograph projectors for projecting two or three color picture records, produced from negatives taken through suitable color filters and preferably simultaneously in groups of two or three at each exposure on one film, such pictures being projected simultaneously in groups of two or three through separate projection lenses and suitable color filters, which may be stationary or moving or embodied in the film; and the invention has for its object the provision of new or improved means and appliances for more efficiently and satisfactorily illuminating the separate two or three gate apertures used in such apparatus, from one arc or other suitable single light source.

The object to be aimed at in such apparatus is that each gate aperture should be evenly illuminated with a condensed cone or pyramid of light rays (hereinafter for shortness included in the word cone) which passes normally through the gate aperture and the center of the corresponding projecting lens; that the light should be so divided and distributed between the gate apertures that each gate aperture should receive any desired proportion of light and preferably a proportion corresponding to the color of the projecting color filter used for each gate, so that a satisfactorily balanced colored picture may be produced on the screen without undue loss of light; and that the gate should be so illuminated in each case that a slight movement of the arc or other single light source does not unduly disturb the color balance of the projected picture.

These requirements can be to a large extent fulfilled by the present invention, which broadly described consists in providing means for condensing a cone of light emanating from one arc or other single light source in two or three subsidiary cones and separately deflecting each such condensed subsidiary cone as may be necessary, in such a way that each such condensed subsidiary cone covers one suitably placed gate aperture and a reasonable margin all around it; and in providing straightening prisms close to each gate, preferably on the lantern side of them, which again bend the condensed rays so that each condensed subsidiary cone of rays passes normally through one gate aperture and the center of the corresponding projecting lens.

In other words the invention comprises a color cinematograph projector having two or more gate apertures and corresponding projection lenses, in which, by a prismatic element provided in, at, or near to the condenser, a portion of the condensing light is deflected toward a gate aperture so as to illuminate that gate aperture and a margin around it, and in which, by a prism at the gate, the deflected beam is redirected to pass normally through the gate aperture and through the center of the corresponding projection lens.

In the case of two color projection the two gate apertures so illuminated with their condensed deflected and straightened subsidiary cones of light rays may be placed close together or be separated to any reasonable desired extent and may be arranged one above the other either directly or at an angle with each other or side by side at the same or different levels. For three color projection two of the three gates may be illuminated by separately deflected and straightened subsidiary cones of condensed light rays as explained, and these two gates may be separated to permit a direct condensed subsidiary cone of light rays to illuminate a third gate aperture situated directly between them; or the condensed subsidiary cone of light for the third gate may also be deflected and straightened, in cases where the third gate aperture is disposed otherwise than directly between the other two gates. By these means for three color work, the gates may be arranged one above the other vertically or obliquely or side by side at the same or different levels, and the gates may either be arranged close together or spaced apart to any desired extent.

The deflecting prisms, that are next to the condenser and which so engage the main beams as to generate secondary beams (one for each gate) are so adjusted as to cause each secondary beam to more than cover its gate, that is to say, to give a margin of illumination all around each gate. This condition tends to counterbalance any injurious effect on the illumination by reason of the movements of the source of light which are inevitable. Further if the adjustment of the secondary beams or cones of light is such that all have approximately the same degree overlap (each beam on its respective gate) a shifting of the source of light will affect all gates about equally and the color balance will be maintained. This function of device or apparatus is an important characteristic and this function distinguishes my apparatus from previous inventions in which a slight deflection may put one beam virtually off the gate, and leave the other beam on the gate; the result being a glaringly false color effect. The kind of shifting of the light hereinabove referred to is shift on the medial line common to both gates (whether this line is vertical as $x$—$y$ in Fig. 1, $x^2$—$y^2$ Fig. 5, or horizontal as $x'$—$y'$ in Fig. 3) or the equivalent medial lines incident to a staggered set of gates (Fig. 8).

The prisms for deflecting and straightening the subsidiary condensed light cones may in some cases be formed with a cylindrical or approximately cylindrical curvature in one direction on one or both faces or in one direction on one face and another direction on the other face in such manner as to distribute the light over the gate areas as desired and direct on to the gates light rays from parts of the condenser area which would otherwise be ineffective, thus obtaining a higher illumination of the gates. For example by this means a more or less square shaped area at the gate may be illuminated from a more or less rectangular area of the condenser face.

The means described may be employed for the purpose of producing a greater illumination of one gate than of another, or for the purpose of dividing and distributing the light available over the two or three gate apertures as the case may be in the desired proportions corresponding to the color of the projection color filters used at each gate, so that a satisfactorily balanced colored picture may be produced on the screen without undue loss of light.

The subsidiary cones of rays for the different gates may be condensed by portions of condensers so cut and set that they condense and deflect the subsidiary cones of rays to the desired extent, but a moderately large double condenser of the ordinary type is preferably used in all cases, the necessary deflecting prisms being preferably placed close to and in front of it, i. e., between the condenser and the projector gates.

In applying this invention for example to a two color projector in which the two gate apertures are arranged close together and one above the other an arrangement such as the following may be employed:—

Two portions of the area of a single condenser are used to condense the two cones of light rays, two slightly deflecting glass prisms fitted close up to the condenser on the opposite side from the arc being used to cause the two subsidiary light cones to converge slightly, so that when they reach the two gate apertures placed close to each other in the gate of the projector they cover the gate apertures and a margin all around them, the illuminated areas overlapping to some extent. Two straightening prisms, which may be attached to the hinged portion of the gate, again bend the cones of rays so that they pass normally through the gate apertures and the center of the two projection lenses.

I am aware that a similar arrangement has been suggested before, without the slightly deflecting prisms at the condenser, but unless these are fitted or provided, causing the two subsidiary light cones to cover their respective gate apertures with some margin all around them, a small movement of the arc on the medial line common to the gate apertures disturbs the color balance on the projecting screen to a marked degree rendering the system quite impractical for general use.

In the event of the gate apertures being arranged side by side and separated to a slight extent, so that ordinarily only the light from the long narrow area of the condenser face would fall upon these gates, a positive cylindrical or approximately cylindrical curvature may be given to one or both faces of the deflecting prisms at the condenser, and a corresponding negative cylindrical or approximately cylindrical curvature may be given to one or both faces of the straigtening prisms at the two corresponding gate apertures, the effect of the positive curvature on the prisms at the condenser being to converge the light rays from portions of the condenser face lying outside the area which would otherwise illuminate the gate, so that much more of the effective condenser area available is utilized, and the effect of the negative curvature on the prisms at the gate enables such rays to focus again at or about the common focus. A similar effect may be produced by using suitable prisms at the condenser with suitable negative cylindrical curvature upon them in the vertical direction and suitable postive curvatures on the prisms at the gate apertures.

By means such as just described it is possible to illuminate a comparatively long narrow strip at the gate from a more or less square shaped area of the condenser face, and conversely by adding a negative cylindrical or approximately cylindrical curvature to one or both faces of a prism at the condenser and a positive cylindrical or approximately cylindrical curvature to one or both faces of a prism at the gate it is possible to illuminate a more or less square shaped area at the gate from a comparatively long narrow strip at the condenser face.

Further, these two effects may be combined by applying suitable separate cylindrical or approximately cylindrical curvatures to each face of a deflecting prism at the condenser face and to each face of a straightening prism at the gate to the desired extent, so that a strip more or less narrow in one direction at the gate may be illuminated by a strip more or less narrow in another direction at the condenser face.

In other words the invention also comprises a projector in which a cylindrically curved element is combined with the prismatic element in, at, or near the condenser to distort the condensing light passing through it so as to more effectively illuminate the gate aperture and a margin around it, and in which a cylindrically curved element is combined with the prismatic element at the gate to more or less correct the distortion introduced by the curved element at the condenser while preserving the functioning of the prismatic element at the gate.

Further as the angle of the deflecting prism determines the amount and direction of the displacement of the illuminated gate area from a center line drawn through the axis of the condenser and the center of the arc or other light source it is possible by the means described to illuminate two or three gate apertures arranged at any expedient separation and relative angle to each other, and by dividing up the area at the condenser face and causing the light rays emitted by each portion to illuminate the desired gate area and by curving one or both faces of the deflecting prisms as described to the necessary extent, it is possible to illuminate each gate with the desired percentage of light emitted from the condenser area used.

In the case of three color projection the middle or intermediate image may be illuminated from a condenser area of a different shape to the gate, and in such case flat prisms, hereinafter included by the term prism, with the desired cylindrical curvature on one or both faces may require to be placed both at or near the gate and at or near the condenser face. In the event of the intermediate gate not being placed directly between the other two, either at one level or at different levels, it may be desirable to deflect to some extent the subsidiary cone or portion of light used to illuminate the intermediate gate, and in that event a deflecting prism may be used at the condenser and a straightening prism at the gate, of the character already described. A dividing plate is preferably fitted between the gate apertures and the projection lenses in a two color projector, to prevent the formation of secondary images, and in three color projectors two such dividing plates are preferably fitted.

As illustrative of the invention I will describe with reference to the accompanying diagrams some examples of its application.

Figures 1 and 2 are front and side sectional views of an illumination device according to this invention and suited for a plurality of gates vertically disposed.

Figs. 3 and 4 are smaller views of another form of illumination device suited for a plurality of gates disposed side by side.

Figs. 5 and 6 are front and sectional plan views of another form of illumination device suited for a plurality of gates disposed side by side and adapted for unequal illumination of the respective gates.

Figs. 7 and 8 are diagrams of different arrangements of side by side gates which may be illuminated by an illumination device according to the present invention.

Fig. 6ª illustrates the vertical sections of the prisms at the condenser of the arrangement according to Fig. 6, and Fig. 6ᵇ illustrates vertical sections of the prisms at the gate of the arrangement according to Fig. 6.

Figs. 1 and 2 indicate in face view and sectional side elevation one form of apparatus for two color projection in which the two gates are disposed one above the other, for the projection of two color records in super-imposition on the screen. The two color filters are not shown in the figure.

$c$ is a condenser and $g$ $g$ the two projection gate apertures. $d$ $d$ represent two deflecting prisms disposed in front of the condenser and each serving to deflect a subsidiary cone of the light rays from the condenser face, so that each such cone covers one of the gate apertures $g$ $g$ and a margin around it, the areas of illumination of the respective cones overlapping each other at the gate as shown. $s$ $s$ are straightening prisms placed near the gate apertures and serving to bend the deflected rays again so that each condensed subsidiary cone passes normally through the gate aperture and the center of the corresponding projecting lens $l$ $l$. $p$ is a dividing plate disposed between the two lenses and the gate apertures as before mentioned.

In the form shown by Figs. 3 and 4 which are a face view and a sectional side elevation respectively, there are two gate apertures $g$ $g$ disposed side by side, at a slight separation. $d^1$ $d^1$ are two deflecting prisms placed in front of the condenser c to deflect the rays of the right and left hand portions of the light from the condenser so that these portions each cover one of the gate apertures and a margin around it. Straightening prisms $s^1$ are placed close to each gate aperture $g\ g$ to bend the deflected rays back so that each portion passes normally through the gate aperture and the center of the corresponding projection lens. The deflecting prisms $d^1\ d^1$ are formed with a positive cylindrical curvature so as to converge and direct on to the desired areas at the gates light from the outlying upper and lower portions of the condenser, so that the light from an approximately square area A B C D of the condenser face (Fig. 3) is converged into the form of an equally long narrower area $A^1\ B^1\ C^1\ D^1$ at the gate, thus obtaining a higher illumination of the gate apertures and effecting a gain of illumination represented for example by the hatched strips in Fig. 3. The straightening prisms $s^1$ are formed with a negative cylindrical curvature to enable the converged and deflected rays to focus again at or about the common focus.

It is often desirable to give a pronouncedly greater illumination to one color than another, sometimes in relation to the original taking of the film, sometimes in relation to special effects in the exhibition theater, sometimes in relation to the text of the light used for projection, and diagrams 5 and 6 are a face view and a sectional plan view of another arrangement having two projection gates disposed side by side and adapted to give more light to one gate than to the other, the deflecting prism or lens-prism $d^2$ at one side being cylindrically curved on both faces as shown in Fig. 6 and by separate detail views Fig. 6ª which show these prisms in vertical section so as to illuminate a more or less rectangular area having its longer sides horizontal at the gate and a margin around same from a rectangular area $A^2\ B^2\ E^2\ D^2$ of the condenser face having its longer sides vertical, and the other deflecting prism $d^3$ cylindrically curved on one face only serving to illuminate the corresponding gate aperture $g^2$ and a margin around same from the condenser area $A^2\ EFD^2$. The straightening prisms bend back the cones of light rays so that these pass normally through the gate apertures and the centers of the lenses $l\ l$ and at the same time by means of the cylindrical curvature given to both faces of prism $s^2$ and the single cylindrical curvature on $s^3$ bring the condensed rays more or less to a common focus. Fig. 6ᵇ shows a detail vertical section through the prisms $s^2\ s^3$.

Figs. 7 and 8 show diagrammatically arrangements of three color gates which can be illuminated by means such as described from the different areas of condenser face shown. In these figures three gate areas A B C disposed side by side at the same level (Fig. 7) or at different levels (Fig. 8) are respectively illuminated from the areas $A^1\ B^1\ C^1$ of the condenser c by the employment of suitable deflecting prisms adapted to converge the rays of the respective horizontally narrow condenser face areas $A^1\ B^1\ C^1$ on to vertically narrow areas A B C at the gate, straightening prisms or devices being used in combination with the deflecting prisms for the purpose above mentioned. Similar results may be obtained by turning the entire system around 90° so that the gates become vertical instead of horizontal.

It is to be understod that in two color projectors the gates may be arranged alongside each other at different levels.

What I claim is:—

1. Apparatus for illuminating a multiplicity of gate apertures and directing the light through corresponding projection lenses in a color cinematograph projector, comprising, in combination, a source of light, a condenser to produce a main beam, means for deflecting a portion of the condensing light toward a gate aperture, so that the gate aperture is covered and marginally surrounded by a secondary beam separated by the deflecting means, and means for redirecting the deflected secondary beam to pass normally through said gate aperture and through the center of the corresponding projection lens.

2. Apparatus for illuminating a multiplicity of gate apertures and directing the light through corresponding projection lenses in a color cinematograph projector, comprising, in combination, a source of light, a condenser to produce a main beam, means for deflecting and for distorting a portion of the condensing light toward a gate aperture, so that the gate aperture is covered and marginally surrounded by a secondary beam separated by the deflecting and distorting means, and means for redirecting and for correcting the deflected and distorted beam to pass with the distortion corrected, normally through said gate aperture and through the center of the corresponding lens.

3. A multi-color cinematograph projector having a plurality of gate apertures and corresponding projection lenses, a light source, a condenser to produce a main beam, a prismatic element for each gate provided in, at, or near to said condenser to deflect a portion of the beam so that each gate is covered and marginally surrounded by a secondary beam separated by the prismatic element at the condenser, and a redirecting prism element at each gate.

4. A multi-color cinematograph projector having a plurality of gate apertures and corresponding projection lenses, a light source, a condenser to produce a main beam, a prismatic element combined with a cylindrically curved element for each gate, provided in, at, or near to said condenser to deflect and distort a portion of the beam so that each gate is covered and marginally surrounded by a secondary beam separated by the prism-lens combination, and a prismatic element combined with a cylindrically curved element at each gate to correct the distortion and redirect the secondary beam.

5. A multi-color cinematograph projector having a plurality of gate apertures and corresponding projection lenses, a light source, a condenser to produce a main beam, a prismatic element for each of two of the gates, provided in, at, or near to said condenser to deflect a portion of the beam so that each gate is covered and marginally surrounded by a secondary beam separated by the prismatic element at the condenser, and a redirecting prismatic element at each of the two corresponding gates, and a third gate aperture situated directly between the said two gate apertures.

6. A multi-color cinematograph projector having a plurality of three gate apertures and corresponding projection lenses, a light source, a condenser to produce a main beam, a prismatic element combined with a cylindrically curved element for each of two of the gates, provided in, at, or near to said condenser to deflect and distort a portion of the beam so that each gate is covered and marginally surrounded by a secondary beam separated by the prism-lens combination, and a prismatic element combined with a cylindrically curved element at each of the two corresponding gates to correct the distortion and redirect the secondary beam, and a third gate aperture situated directly between the said two gate apertures.

7. A multi-color cinematograph projector having a plurality of three gate apertures and corresponding projection lenses, a light source, a condenser to produce a main beam, a prismatic element combined with a cylindrically curved element for each of two of the gates, provided in, at, or near to said condenser to deflect and distort a portion of the beam so that each gate is covered and marginally surrounded by a secondary beam separated by the prism-lens combination, and a prismatic element combined with a cylindrically curved element at each of the two corresponding gates to correct the distortion and redirect the secondary beam, a third gate aperture situated directly between the said two gate apertures, a cylindrically curved element provided in, at, or near to the condenser for such third gate aperture and a cylindrically curved element provided at said third gate aperture.

In testimony whereof, I affix my signature.

HAROLD WORKMAN.